United States Patent [19]

Edwards et al.

[11] Patent Number: 5,029,964
[45] Date of Patent: Jul. 9, 1991

[54] OPTICAL FIBRE RECEIVING AND LASER BEAM COMBINING UNIT

[75] Inventors: Glyn R. Edwards, Rugby; Keith Withnall, West Haddon, both of United Kingdom

[73] Assignee: Lumonics Ltd., Warwickshire, United Kingdom

[21] Appl. No.: 350,663

[22] Filed: May 10, 1989

[30] Foreign Application Priority Data

May 16, 1988 [GB] United Kingdom ............. 8811532.4

[51] Int. Cl.$^5$ .................. G02B 6/32; G02B 27/00; G02B 27/10
[52] U.S. Cl. .................. 350/96.18; 350/96.20; 350/174; 350/169
[58] Field of Search .................. 350/96.18, 96.20, 174, 350/515, 169, 167

[56] References Cited

U.S. PATENT DOCUMENTS

| | | | |
|---|---|---|---|
| 3,513,306 | 5/1970 | Vantine | 240/41.3 |
| 3,518,419 | 6/1970 | Humphrey | 240/41.3 |
| 3,588,440 | 6/1971 | Morse | 219/121 |
| 3,743,383 | 7/1973 | Giallorenzi | 350/172 |
| 3,802,767 | 4/1974 | Rambauske | 350/294 |
| 4,185,891 | 1/1980 | Kaestner | 350/167 |
| 4,289,378 | 9/1981 | Remy et al. | 350/174 |
| 4,344,671 | 8/1982 | Lang | 350/174 |
| 4,566,765 | 1/1986 | Miyauchi | 350/619 |
| 4,705,351 | 11/1987 | Toda | 350/96.20 X |
| 4,844,574 | 7/1989 | Chande | 350/96.18 |
| 4,868,361 | 9/1989 | Chande et al. | 219/121.62 |

FOREIGN PATENT DOCUMENTS 0185360 6/1986 European Pat. Off. .
59-200211 4/1983 Japan .
124209 7/1987 Japan .

OTHER PUBLICATIONS

Instrum. & Experim. Tech., vol. 21, No. 3/2 1978 May-Jun., pp. 767-768, "Means for Combining the Light of Several Layers" A. E. Pozdnyakov.
Arata, *Challenge to Laser Advanced Materials Processing*, Proceeding of LAMP '87 Osaka (May 1987).

*Primary Examiner*—Akm Ullah
*Attorney, Agent, or Firm*—Nixon & Vanderhye

[57] ABSTRACT

A laser beam combining unit combines the output beams of a plurality of high power lasers after the beams have been transmitted along, for example, three optical fibres. The beam combining unit includes a holder arrangement for receiving the ends of the optical fibres, three collimating lenses, and a single focusing lens. The ends of the three optical fibres are located substantially in a common plane and circularly spaced at 120° intervals. The three collimating lenses are also located substantially in a common plane and their axes are circularly spaced at 120° intervals. Each of the collimating lenses is aligned with one of the optical fibres. The laser beams are directed by the collimating lenses, as collimated beams, onto the focusing lens with axes of the individual beams parallel to each other. The beams are focused by the focusing lens to a common point for performing a material processing operation.

6 Claims, 3 Drawing Sheets

OPTICAL FIBRE RECEIVING AND LASER BEAM COMBINING UNIT

BACKGROUND OF THE INVENTION

This invention relates to a beam combining unit, and also to a laser system in which the beams from a plurality of lasers are combined.

There is an increasing requirement for material processing operations using laser beams to be carried out at high average powers. For example, in the case of solid-state lasers, there is a growing requirement for average powers in excess of 1 kW. One approach to producing such high average powers is to produce a laser of the required capability. Another approach is to combine the outputs of a number of smaller lasers to provide the same level of average power. Many applications require the laser beam to be delivered to the workpiece by means of a fibre optic delivery system and so it is desirable to combine laser beams in a manner which permits them to be transmitted by such a delivery system.

BRIEF SUMMARY OF THE INVENTION

It is accordingly one object of this invention to provide a unit capable of combining the beams from a number of individual lasers; and another object of this invention is to provide a laser system in which the beams from a number of lasers are combined.

According to a first aspect of this invention, there is provided a beam combining unit for combining the output beams of a plurality of lasers after the beams have been transmitted along optical fibres, said beam combining unit comprising a single focusing lens, a plurality of collimating lenses each of which is spaced from the focusing lens on one side thereof, and a holding means located on the opposite side of the collimating lenses from the focusing lens for receiving the ends of a plurality of optical fibres, the focusing lens, the collimating lenses and the holding means being arranged so that, in use, laser beams transmitted along the optical fibres are directed by the collimating lenses, as collimating beams, onto the focusing lens with the axes of the individual beams parallel to each other.

The beam combining unit of the first aspect of this invention is capable of combining the beams from a number of individual lasers after the beams have been transmitted along optical fibres so that the beams are focused to a common point.

According to a second aspect of this invention, there is provided a laser system comprising a plurality of individual lasers, a beam combining unit according to the first aspect of this invention, a plurality of optical fibres each of which has one end received by the beam combining unit, and a plurality of optical devices each of which focuses the output beam from a respective laser onto the other end of a respective one of said optical fibres.

BRIEF DESCRIPTION OF THE DRAWINGS

This invention will now be described in more detail, by way of example, with reference to the drawings in which.

DETAILED DESCRIPTION

Figure 1:
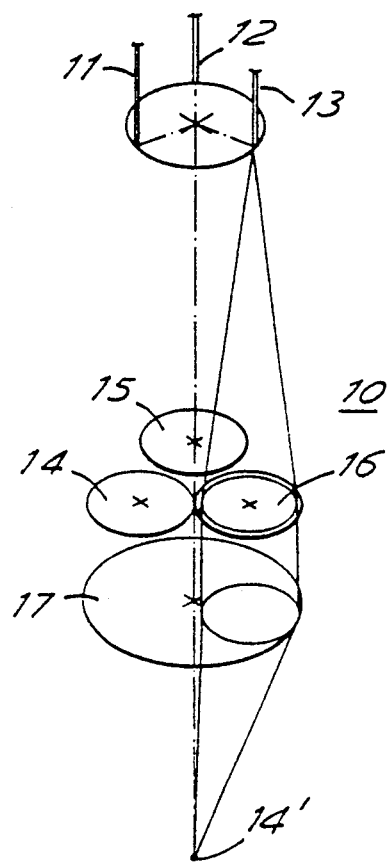
FIG. 1 is a diagrammatic perspective view of a beam combining unit embodying this invention.

Referring now to FIG. 1, there is shown a beam combining unit 10 which combines the output beams from three flexible optical fibre assemblies 11, 12, 13 and focuses them to a common point. At the input side of the unit 10, the optical fibre assemblies are received at positions which are circularly spaced relative to each other at 120° intervals. The diverging beam from each of the optical fibre assemblies 11, 12, 13 is collimated by an associated one of a set of collimating lenses 14, 15, 16, which are circularly spaced from each other at 120° intervals. The resulting parallel beams from the collimating lenses 14, 15, 16 are then focused by a single focusing lens 17 to the common point. The focusing lens 17 is the only optical component which is subjected to the combined power of all three laser beams.

Figure 2:
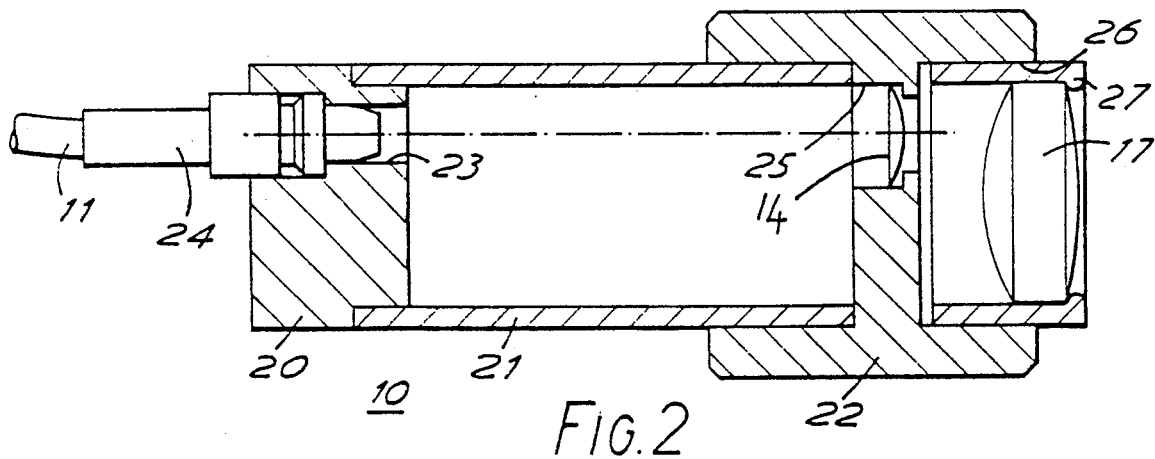
FIG. 2 is a longitudinal sectional view of the beam combining unit of FIG. 1.

The beam combining unit 10 is shown in more detail in FIG. 2. As shown there, the unit 10 comprises a holder member 20, a tubular member 21, and a head member 22, the holder member 20 being received in one end of the tubular member 21 and the other end of tubular member 21 being received in head 22.

In the holder member 20, there are formed three stepped cylindrical bores, only one of which is shown in FIG. 2, and each of these bores receives a connector mounted on the end of an associated optical fibre assembly. In FIG. 2, there is shown a connector 24 mounted on the end of fibre assembly 11 and received in a bore 23. The three bores are arranged in a common plane and spaced circularly relative to each other at 120° intervals.

In the head member 22, there are formed three stepped cylindrical bores, in each of which is mounted one of the collimating lenses 14, 15, 16. In FIG. 2, there is shown the collimating lens 14 mounted in bore 25. In the present example, each of the collimating lenses comprises a single plano-convex lens element. These bores are arranged so that the collimating lenses 14, 15, 16 lie in a common plane with their axes spaced circularly relative to each other at 120° intervals. Each of the collimating lenses 14, 15, 16 is co-axial with its associated one of the bores in the holder member 20.

The three stepped cylindrical bores in head member 22 lead to a single cylindrical bore 26 containing a lens mount 27 for the focusing lens 17. In this example the focusing lens 17 comprises a two element achromatic lens. The axis of the focusing lens 17 is parallel to the axis of the three collimating lenses 14, 15, 16.

Figure 3:
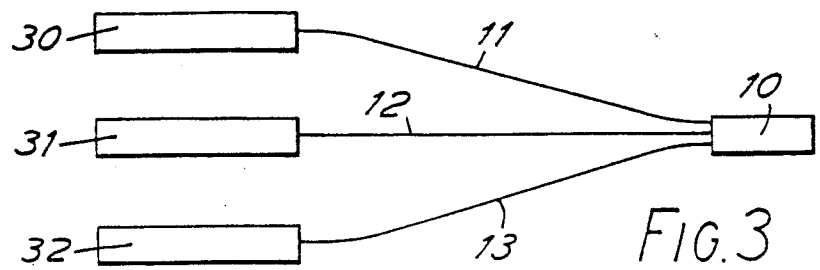
FIG. 3 is a block diagram of a laser system embodying this invention.

Referring now to FIG. 3 there is shown a laser system which comprises three individual lasers 30, 31, and 32. The output beam from each of the lasers 30, 31, 32 is focused by a focusing lens, not shown, onto end of a respective one of the optical fibre assemblies 11, 12, 13. As described above, the other end of each of the fibre assemblies 11, 12, 13 is connected to the beam conbining unit 10. Thus, in the system of FIG. 3, the output from all three lasers 30, 31, 32 may be combined and focused to a single point. By using the fibre optic delivery system comprising the fibre assemblies 11, 22, 13 together with the beam combining unit 10, the combined output from the three lasers may be readily delivered to a desired location to perform a material processing operation.

Figure 4A:
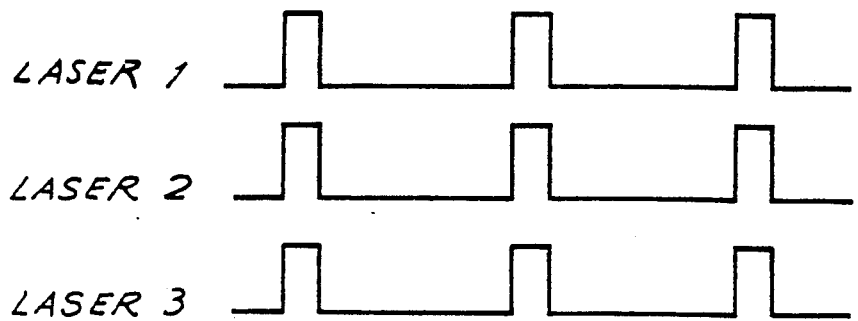
FIG. 4 shows three sets of graphs illustrating three methods of combining pulsed laser beams.
Figure 4B:
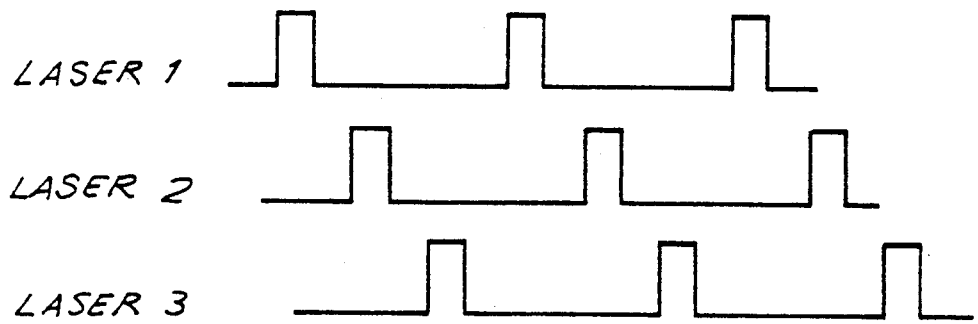
Figure 4C:
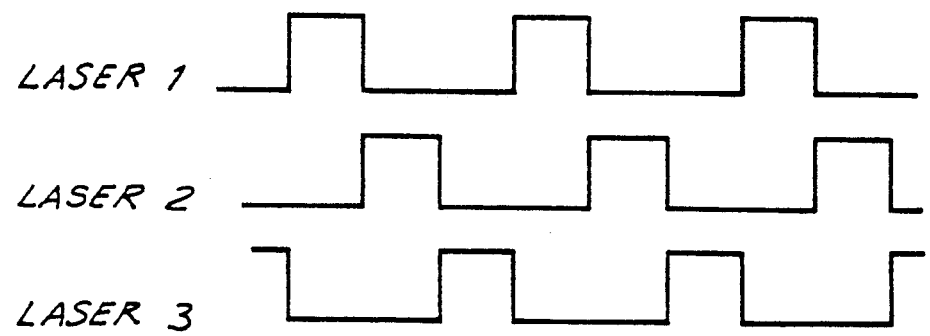

Each of the lasers 30, 31, 32 may be, for example, a JK 701 Nd-YAG laser supplied by Lumonics Limited, Rugby, England. Each of these lasers produces a beam having an mean output power of 400W. In an experiment using three such lasers together with the beam combining unit as shown in FIGS. 1 and 2, the power delivered to the focus point was found to be about 1 kW.

Where pulsed lasers are used, the individual pulses may be combined in various ways, three such ways being illustrated in FIGS. 4a, 4b, 4c. As shown in FIG. 4a, the pulses from the individual lasers may be delivered simultaneously, thereby achieving the same output frequency as that delivered by the individual lasers but with a pulse energy nearly three times greater than the pulse energy from each individual laser. As shown in FIG. 4b, the individual pulses may be interleaved so that each pulse has nearly the same energy as the pulses from the individual lasers but with an output repetition rate three times greater than the repetition rate from the individual lasers. As shown in FIG. 4c, by broadening the pulse durations, a continuous wave output may be obtained.

The laser system shown in FIG. 3 is suitable for various types of material processing operation, such as drilling, welding, and cutting.

Although in the lens combining unit of FIGS. 1 and 2 three laser beams are combined, the lens combining unit may be readily modified to combine only two laser beams or more than three, for example, 7 or 20 laser beams. Where 7 laser beams are combined, this may be achieved by using seven discrete collimating lenses, with one of the collimating lenses occupying a central position and the other six collimating lenses spaced around the central lens at equally spaced circumferential intervals. Where a large number of laser beams, for example 20, are combined, the discrete collimating lenses may be replaced by a single lenticular element providing the required number of individual lenses.

Although in FIGS. 1 and 2, the ends of the fibre assemblies 11, 12, 13 are co-planar and the collimating lenses 14, 15, 16 are co-planar, the lens combining unit 10 may readily be modified so that the ends of the fibre assemblies or collimating lenses or both of these are staggered relative to each other. However, in order to obtain a collimated beam at the output of each collimating lens, each collimating lens should be spaced from the end of its associated fibre assembly by a distance equal to the focal length of the lens.

Each of the collimating lenses 14, 15, 16 and the focusing lens 17 may be formed either from a single lens element or from a set of lens elements. In this specification the term "lens" is to be interpreted as covering a single lens element or a set of lens elements or, more generally, a lens formed from a set of individual components.

The beam combining units described above may be used so that the common focus point of the beam combining unit corresponds ot the point at which a desired material processing operation is to be performed. Alternatively, the beam combining units may be used to couple the laser beams directly, or indirectly, into a single fibre assembly. For example, the input face of the single fibre assembly may be located at the common focus point.

Figure 5:
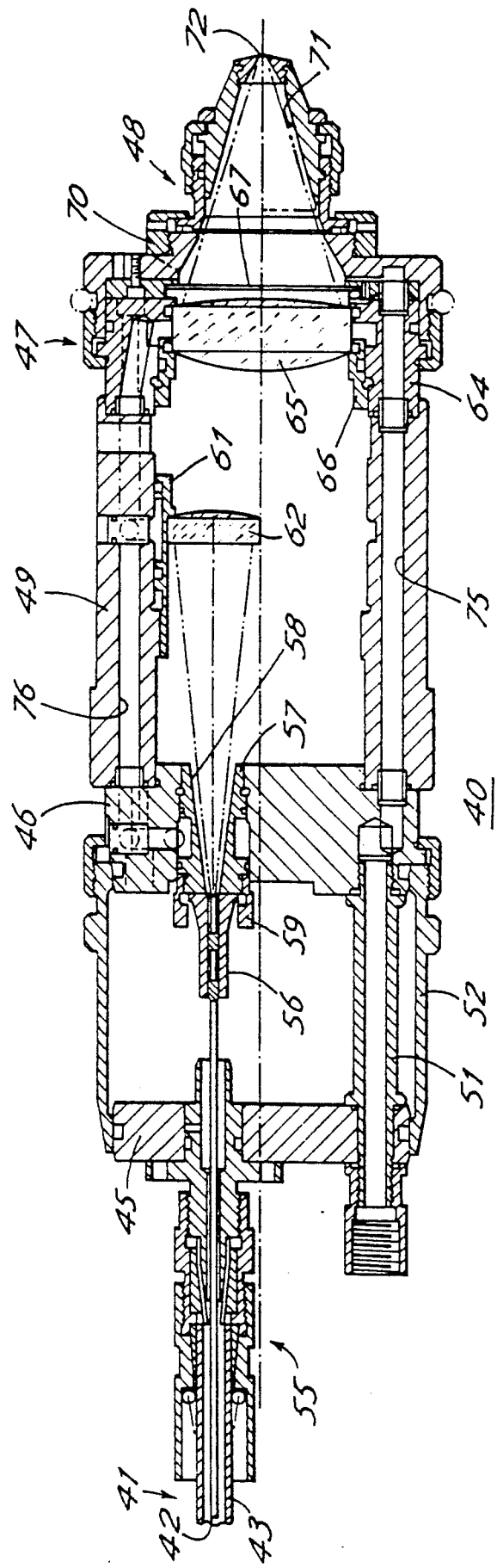
FIG. 5 is a longitudinal sectional view of another beam combining unit embodying this invention.

Referring now to FIG. 5, there is shown a longitudinal sectional view of another beam combining unit 40 embodying this invention. The beam combining unit 40 combines the output beams from three optical fibre assemblies and focuses them to a single point for performing a material processing operation. In FIG. 5, only one of the optical fibre assemblies is shown and this optical fibre assembly is indicated by reference numeral 41. For reasons of clarity, the parts of the beam combining unit 40 associated with the other two optical fibre assemblies and also certain other parts are omitted from FIG. 5. As shown in FIG. 5, the optical fibre assembly 41 comprises an optical fibre 42 guided in a conduit 43.

the beam combining unit 40 icludes a first holder member 45, a second holder member 46, a head assembly 47 and a nozzle assembly 48. The second holder member 46 is connected to the head assembly by a tubular member 49. The first and second holder members 45, 46 are connected together by a gas pipe 51 and an inlet water pipe and an outlet water pipe, not shown. The gas pipe 51 has an inlet to the left of the first holder member 45. Although not shown, the water pipes are provided, respectively, with an inlet and an outlet to the left of the first holder member 45. The three pipes are circularly spaced relative to each other at intervals of 120°. A cover 52 extends around the three pipes and between the first and second holder members 45, 46.

The optical fibre assembly 41 is received in a connector assembly 55 mounted in a bore formed in the first holder member 45. The end of the conduit 43 is held in the connector assembly 55 but the optical fibre 42 passes through the first holder member 45 and its end is held in a support member 56 by grub screws, not shown. The grub screws permit the position of the end of the optical fibre 42 to be adjusted axially.

A mounting member 57 having a conical light passage 58 is mounted in a bore in the second holder member 46. A mounting ring 59 is secured to the mounting member 58. As shown in FIG. 5, the right hand end of the support member 56 engages the left hand face of the mounting member 57 and the support member 56 is held in position by grub screws, not shown, extending radially inwards from the mounting ring 59. The grub screws permit the position of the support member 56, and hence the end of the optical fibre 42, to be adjusted laterally.

The other two optical fibre assemblies are received in a similar manner. The ends of all three optical fibres lie substantially in a common plane and are circularly spaced at 120° intervals.

An annular lens mount 61 engaged with the inner surface of tubular member 49. The lens mount 61 holds a collimating lens 62 associated with the optical fibre 42 and also two other collimating lenses, not shown, associated with the other two optical fibres. In FIG. 5, only the part of lens mount 61 associated with lens 62 is shown. The three collimating lenses lie in a common plane and their axes are circularly spaced at intervals of 120°.

The head assembly 47 includes a lens mount 64 for a sinle convex focusing lens 65. The lene 65 is held in place by a mounting ring 66. The axis of lens 65 and the axes of the three collimating lenses are substantially parallel to each other. A protection slide 67 is mounted in head assembly 47.

The head assembly 47 also includes a support member 70 for the nozzle assembly 48. The nozzle assembly 48 has a substantially conical light transmitting passage 71 which terminates in an outlet aperture 72.

A gas passage 75 is formed in the tubular member 49. One end of gas passage 75 communicates with the gas pipe 51 and the other end communicates with the inside of nozzle assembly 48.

A pair of water passages are formed in the tubular member 49 and one of these is shown and indicated by reference number 76. These two water passages communicate with the two water pipes mentioned earlier. A system of conduits is provided in the second holder member 46, the tubular member 49 and the head assembly 47. These conduits cause cooling water, which enters through the inlet water pipe, to flow around the support member 57, the lens mount 61 and the focusing lens 65 before leaving through the outlet water pipe.

In use, the beam combining unit 40 may receive the output beams from three lasers via three optical fibre assemblies in a manner similar to that described with reference to FIG. 3. The position of the ends of the three optical fibres are adjusted accurately so that the three collimating lenses direct three collimated and mutually parallel beams onto the focusing lens 65. The focusing lens 65 focuses the three beams to a common point just outside the outlet aperture 72. The beam combining unit 40 may be held in a robotic device and manipulated so as to perform a desired material processing operation.

A gas may be supplied through gas pipe 51 so that the material processing operation is performed in an atomsphere which assists that operation. For example, in the case of cutting, the assisting gas may be oxygen.

We claim:

1. A laser system having a beam combining unit for combining the output beams of a plurality of high power lasers after the beams have been transmitted along optical fibres by focusing the beams to a common point, said laser system comprising:
    a plurality of high power lasers;
    an individual optical fibre, having a first end and a second end, associated with each laser, each laser being arranged to focus its output beam onto said first end of its associated optical fibre; and
    a beam combining unit for combining the output beams of the lasers, said beam combining unit including:
    holder means for receiving and holding the second ends of the optical fibres,
    an individual and discrete collimating lens associated with each optical fibre, each collimating lens being spaced from said second end of its associated optical fibre by a distance substantially equal to its focal length, each collimating lens being arranged to collimate the output beam from its associated optical fibre produce a collimated beam, and the optical axes of said collimating lenses being substantially parallel to each other, and
    a single focusing lens located on the opposite side of each of the collimating lenses from the holder means and having its optical axis parallel to the optical axes of the collimating lenses, the focusing lens being arranged to combine the collimated beams from the collimating lenses by focusing the collimated beams to a common point which is located on the opposite side of the focusing lens from the collimating lenses.

2. A laser system as claimed in claim 1, in which the collimating lenses lie substantially in a common plane at circularly spaced positions and the holding means is arranged so that said second ends of the optical fibres lie substantially in another common plane at circularly spaced positions.

3. A laser system as claimed in claim 2, in which there are three lasers, three optical fibres and three collimating lenses.

4. In a laser system having a plurality of high power lasers, and an individual optical fibre, having a first end and a second end, associated with a respective laser, each laser being arranged to focus its output beam onto said first end of its associated optical fibre, a beam-combining unit for combining the output beams of the lasers, said beam combining unit comprising:
    an optical fibre holder for receiving and holding the second ends of the optical fibres,
    an individual and discrete collimating lens associated with each optical fibre, each collimating lens being spaced from said second end of its associated optical fibre by a distance substantially equal to its focal length, each collimating lens being arranged to collimate the output beam from its associated optical fibre to produce a collimated beam, and the optical axes of said collimating lenses being substantially parallel to each other, and
    a single focusing lens located on the opposite sid of each of the collimating lenses from the holder and having its optical axis parallel to the optical axes of the collimating lenses, the focusing lens being arranged to combine the collimating beams from the collimating lenses by focusing the collimated beams to a common point which is located on the opposite side of the focusing lens from the collimating lenses.

5. A beam combining unit as claimed in claim 4, in which the collimating lenses lie substantially in a common plane at circularly spaced positions and the optical fibre holder is arranged so that said second ends of the optical fibres lie substantially in another common plane at circularly spaced positions.

6. A beam combining unit as claimed in claim 5, in which the optical fibre holder includes means for receiving three optical fibres and wherein said beam combining unit includes three collimating lenses.

* * * * *